3,583,983
N-BENZENESULFONYL-ISO-INDOLE CARBOXAMIDES
Erhard Schenker, Basel, and Klaus Hasspacher, Riehen, Switzerland, assignors to Sandoz Ltd., also known as Sandoz A.G., Basel, Switzerland
No Drawing. Filed Feb. 23, 1967, Ser. No. 617,812
Claims priority, application Switzerland, Feb. 24, 1966, 2,700/66; Aug. 5, 1966, 11,340/66; Sept. 27, 1966, 13,936/66; Nov. 1, 1966, 15,816/66
Int. Cl. A61k *27/00;* C07d *27/30*
U.S. Cl. 260—239.6                    14 Claims

ABSTRACT OF THE DISCLOSURE

The present invention provides heterocyclic sulphonylurea derivatives of formula:

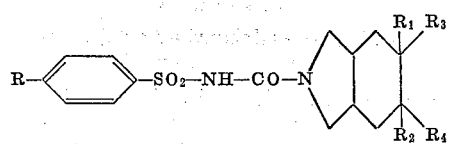

in which R is hydrogen or halogen, alkyl, alkoxy, alkylthio, alkylsulphinyl, alkylsulphonyl, of 1 to 4 carbon atoms, or acyl of 2 to 4 carbon atoms, nitro, amino or acetyl-amino, each of $R_1$ and $R_2$ is hydrogen or together are a second bond, and each of $R_3$ and $R_4$ is hydrogen or alkyl of 1 to 4 carbon atoms, and the pharmaceutically acceptable alkali metal, alkaline earth metal and ammonium salts thereof. These compounds exhibit a pronounced blood sugar lowering effect, and upon administration of low doses, they furthermore have the property of lowering the content of free fatty acids in the blood. The preparation of these compounds is furthermore described.

---

The present invention relates to new sulphonyl-urea derivatives and a process for their production.

The present invention provides heterocyclic sulphonylurea derivatives of Formula I,

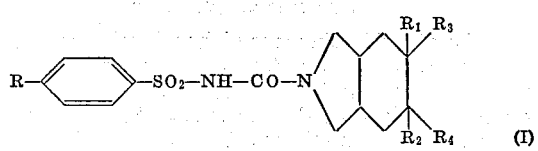

in which:

R signifies a hydrogen or halogen atom, an alkyl, alkoxy, alkylthio, alkylsulphinyl, alkylsulphonyl radical having 1 to 4 carbon atoms or an acyl radical having 2 to 4 carbon atoms, the nitro, amino or acetylamino radical, each of $R_1$ and $R_2$ signifies a hydrogen atom or together signify a second bond, and each of $R_3$ and $R_4$ signifies a hydrogen atom or an alkyl radical having 1 to 4 carbon atoms, and their alkali metal, alkaline earth metal and ammonium salts.

The present invention further provides a process for the production of compounds of Formula I and their alkali metal, alkaline earth metal and ammonium salts, characterized in that a compound of Formula II.

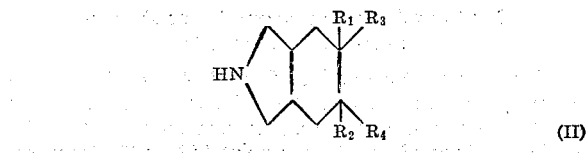

in which $R_1$, $R_2$, $R_3$ and $R_4$ have the above significance, is reacted with a compound of Formula III,

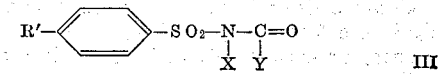

in which:

R' has the same significance as R except that it may not signify an amino radical, and either X and Y together signify a second bond between the carbon and the nitrogen atom, or X signifies a hydrogen atom, and Y signifies an alkoxy radical having 1-4 carbon atoms, and, when a compound of Formula I in which R signifies a nitro or acetylamino radical results, and a compound I in which R signifies an amino radical is desired, reduction or hydrolysis respectively is effected, and, when an alkali metal, alkaline earth metal or ammonium salt is required, salification is effected.

The compounds of Formula II used as starting materials are octahydro-isoindole or 2,3,3a,4,7,7a-hexahydro-1H-isoindole and their derivatives substituted in the 5-position or in the 5- and 6-positions by alkyl substituents.

When X and Y in the Formula III signify a second bond between the carbon and the nitrogen atom, the starting materials are benezenesulphonyl isocyanate or its substitution products.

When Y in the Formula III signifies an alkoxy radical having 1–4 carbon atoms, the starting materials of Formula III are the lower alkyl esters, preferably the methyl and ethyl ester, of the correspondingly substituted benzenesulphonyl-carbamic acid.

The process may, for example, be effected as follows depending on the starting materials used:

A benzenesulphonyl isocyanate (Formula III), e.g. 4-toluenesulphonyl isocyanate, is dissolved in an anhydrous organic solvent, e.g. absolute benzene or toluene, and this solution is added at room temperature during the course of a few minutes to a compound of Formula II dissolved in more of the same solvent, whereupon the reaction product usually starts to precipitate. After stirring at room temperature for 2 to 3 hours, the reaction product has completely precipitated in crystalline form and is isolated and purified in manner known per se.

When benzenesulphonyl-carbamic acid esters, e.g. 4-chlorobenzene- or 4-toluenesulphonyl-carbamic acid ethyl ester, are used as starting materials of Formula III, the process is effected in that the ester and a compound of Formula II are melted at 140–180° C. and the melted material is kept at this temperature at reduced pressure for approximately ½ to 2 hours. The final product is isolated by dissolving the reaction product in a suitable solvent whilst heating, whereupon the compound crystallizes in analytically pure form.

The reaction of compound II with the carbamic acid ester of Formula III may also be effected in an anhydrous organic solvent, e.g. absolute benzene, toluene, xylene, dimethyl formamide or acetonitrile. The solution is heated to the boil at reflux for 5–24 hours. After cooling, the solution is shaken out with a dilute mineral acid in order to split an addition compound of compound I with the amine of Formula II which may be formed, whereupon the desired final product is isolated and purified in manner known per se, e.g. by crystallization.

Compounds of Formula I, in which R signifies the amino radical, cannot be obtained in the manner described above, but may be obtained from the corresponding acetylamino or nitro compounds produced by the above method, by splitting off the acetyl radical hydrolytically, preferably with an aqueous alkali, or reducing the nitro radical, e.g. catalytically with palladium over charcoal in dimethyl formamide, to yield the corresponding compound I in which each of $R_1$ and $R_2$ signifies a hydrogen atom, or with alkali sulphides in water, to yield the corresponding compound I in which $R_1$ and $R_2$ together signify a second bond.

Compounds of Formula II in which one of $R_3$ and $R_4$ signifies a lower alkyl radical, the other signifying hydrogen, or each of $R_3$ and $R_4$ signifies a lower alkyl radical, are new, and together with the process for their production, also form part of the present invention. They may be obtained by adding a butadiene substituted in the 2-position or in the 2- and 3-positions by a lower alkyl radical, to maleic acid anhydride in an inert solvent, e.g. benzene or diethyl ether, at 0–50° C. The resulting addition product is then converted into the corresponding imide by heating with ammonia and the imide is subsequently reduced to the 2,3,3a,4,7,7a-hexahydro-1H-isoindole derivative substituted in the 5-position or in the 5- and 6-positions by a lower alkyl radical, with lithium aluminum hydride in tetrahydrofuran or diethyl ether. The octahydro-1H-isoindole derivatives may be obtained from the corresponding hexahydro-1H-isoindole by catalytic hydrogenation. Hydrogenation may, for example, be effected in ethanol, at room temperature in the presence of platinum oxide, preferably under pressure.

The benzene sulphonyl isocyanates and the benzenesulphonyl-carbamic acid esters used as starting materials of Formula III, insofar as they have hitherto not been described, may be obtained from the known, correspondingly substituted benzenesulphonamides.

The benzenesulphonyl isocyanates used as starting materials may be produced in that the corresponding sulphonamide is heated to approximately 150–200° C. with phosgene in a suitable organic solvent, e.g. nitrobenzene, di- or trichlorobenzene, preferably 1,2,4-trichlorobenzene, the solvent is removed from the cooled reaction mixture by distillation and the desired sulphonyl isocyanate is isolated and purified in manner known per se, e.g. by crystallization.

The sulphonyl-carbamic acid esters, e.g. the methyl or ethyl ester, are obtained in that a benzene-sulphonamide is treated with a chloroformic acid ester in a suitable organic solvent, e.g. acetone, in the presence of an alkaline condensation agent, e.g. sodium or potassium carbonate, at 40–70° C. for 5 to 18 hours. The compound which precipitates from the cooled reaction mixture is subsequently dissolved in water and the aqueous solution is acidified with a mineral acid, e.g. dilute hydrochloric acid, whereupon the desired benzenesulphonyl-carbamic acid ester precipitates and is isolated by filtration and subsequently purified, e.g. by crystallization.

The compounds of the invention have valuable pharmacodynamic properties. Thus, in tests on animals (rats, dogs) they exhibit a pronounced blood sugar lowering effect of long duration, which occurs even upon administration of low doses. When administered in low doses the compounds furthermore have the property of lowering the content of free fatty acids in the blood. These effects are particularly pronounced in the case of N-(4-toluenesulphonyl) - 2 - octahydro-isoindole carboxamide. The compounds are well tolerated and have a low toxicity in comparison with their effectiveness. The compounds of the invention are therefore indicated for use in the treatment of diabetes mellitus and disorders in lipid metabolism, in which case they are preferably administered orally in a daily dose of 50 to 500 mg.

In order to produce suitable medicinal preparations the compounds are worked up with the usual inorganic or organic adjuvants which are inert and physiologically acceptable. Suitable medicinal preparations are, for example, tablets, dragées, capsules, syrups, injectable solutions. Aside from adjuvants, e.g. polyvinyl pyrrolidone, methyl cellulose, talcum, magnesium stearate, stearic acid and sorbic acid, the preparations may contain suitable preserving agents, sweetening and colouring substances and flavourings.

The term "in manner known per se" as used herein designates methods in use or described in the literature on the subject.

Example of a galenical preparation: Tablets, g.

| | |
|---|---|
| N-(4-toluenesulphonyl) - 2 - octahydroisoindole carboxamide | 0.100 |
| Magnesium stearate | 0.0010 |
| Polyvinyl pyrrolidone | 0.0040 |
| Talcum | 0.0050 |
| Maize starch | 0.010 |
| Lactose | 0.038 |
| Dimethyl silicone oil | 0.0005 |
| Polyethylene glycol 6000 | 0.0015 |

For a tablet of 0.160

In the following non-limitative examples all temperatures are indicated in degrees centigrade and are uncorrected.

EXAMPLE 1

N-(4-toluenesulphonyl)-2-octahydro-isoindole carboxamide 12.3 g. of 4-toluenesulphonyl-carbamic acid ethyl ester and 6.3 g. of octahydro-isoindole are melted together and heated to 160° for 2 hours. During the second hour the pressure is lowered to 15 mm. of Hg in order to remove the resulting ethanol. After cooling, the solidified melted material is pulverized and recrystallized from carbon tetrachloride. The compound indicated in the heading has a melting point of 143–144°.

Sodium salt 30 g. of N-(4-toluenesulphonyl)-2-octahydroisoindole carboxamide are dissolved in 200 ml. of ethanol whilst heating slightly and a solution of 4.1 g. of sodium hydroxide in 50 ml. of methanol is added, whereby the sodium salt of N-(4-toluenesulphonyl)-2-octahydro-isoindole carboxamide crystallizes. The white crystals are filtered off, washed with a mixture of ethanol/ether and dried in a vacuum at 70°.

EXAMPLE 2

N-(4-chlorobenzenesulphonyl)-2-octahydro-isoindole carboxamide 13.5 g. of 4-chlorobenzenesulphonyl-carbamic acid ethyl ester and 6.3 g. of octahydro-isoindole are melted together and heated to 160° for 2 hours. During the second hour the pressure is lowered to 15 mm. of Hg in order to remove the resulting ethanol. After cooling, the solidified melted material is pulverized and recrystallized from isopropanol. The compound indicated in the heading has a melting point of 160–162°.

EXAMPLE 3

N-(4-methylthiobenzenesulphonyl)-2-octahydro-isoindole carboxamide 13.8 g. of 4-methylthiobenzenesulphonyl-carbamic acid ethyl ester and 6.3 g. of octahydro-isoindole are melted together and heated to 160° for 2 hours. During the second hour the pressure is lowered to 15 mm. of Hg in order to remove the resulting ethanol. After cooling, the melted material which solidifies in glassy form is pulverized and recrystallized from isopropanol. The compound indicated in the heading has a melting point of 156–157°.

EXAMPLE 4

N-(4-nitrobenzenesulphonyl)-2-octahydro-isoindole carboxamide

This compound is obtained from 27.4 g. of 4-nitrobenzenesulphonyl-carbamic acid ethyl estter and 12.5 g. of octahydro-isoindole in a manner analogous to that described in Example 1. Melting point 152–153° (from isopropanol).

EXAMPLE 5

N-(4-methoxybenzenesulphonyl)-2-octahydro-isoindole carboxamide

This compound is obtained from 13.0 g. of 4-methoxy-benzenesulphonyl-carbamic acid ethyl ester and 6.3 g. of octahydro-isoindole in a manner analogous to that described in Example 1. Melting point 150° (from carbon tetrachloride).

EXAMPLE 6

N-(4-acetylbenzenesulphonyl)-2-octahydro-isoindole carboxamide 12.5 g. of octahydro-isoindole and 13.5 g. of 4-acetyl-benzenesulphonyl-carbamic acid ethyl ester are heated to the boil at reflux in 100 ml. of toluene for 18 hours. After cooling, the solution is shaken out with 20 ml. of 1 N hydrochloric acid and then washed twice, each time with 50 ml. of water. The toluene phase is dried over sodium sulphate, concentrated by evaporation in a vacuum and the residue recrystallized from toluene/petroleum ether. The compound indicated in the heading has a melting point of 159–160°.

EXAMPLE 7

N-(4-aminobenzenesulphonyl)-2-octahydro-isoindole carboxamide 15.0 g. of N-(4-nitrobenzenesulphonyl)-2-octahydro-isoindole carboxamido are dissolved in 50 ml. of dimethyl formamide and hydrogenation is effected with 1.0 g. of palladium/charcoal catalyst (10%) at 5 atmospheres of hydrogen pressure. After filtering off the catalyst, concentration is effected in a vacuum and the residue recrystallized from dimethyl formamide and toluene. The compound indicated in the heading has a melting point of 191–102°.

EXAMPLE 8

N-(4-toluenesulphonyl)-2-octahydro-isoindole carboxamide 7.0 g. of 4-toluenesulphonyl isocyanate are dissolved in 20 ml. of toluene and a solution of 4.5 g. of octahydro-isoindole in 5 ml. of toluene is added dropwise whilst stirring. When the solution which is heated by the reaction to about 60° cools, the reaction product crystallizes. It is filtered off and washed with toluene and petroleum ether. The compound indicated in the heading has a melting point of 143–144°.

EXAMPLE 9

N-(4-toluenesulphonyl)-2,3,3a4,7,7a-hexahydro-1H-isoindole-2-carboxamide 16.0 g. of 2,3,3a,4,7,7a-hexahydro-1H-isoindole and 24.3 g. of 4-toluenesulphonyl-carbamic acid ethyl ester are melted together and heated to 160–170° for 2 hours. During the second hour the pressure is lowered to 15 mm. of Hg in order to remove the resulting ethanol. After cooling, the solidified melted material is pulverized and recrystallized from methylene chloride/petroleum ether. The compound indicated in the heading has a melting point of 150–151°.

EXAMPLE 10

N-(4-toluenesulphonyl)-5,6-dimethyl-2,3,3a,4,7,7a-hexahydro-1H-isoindole-2-carboxamide 24.3 g. of 4-toluenesulphonyl-carbamic acid ethyl ester and 15.1 g. of 5,6-dimethyl-2,3,3a,4,7,7a-hexahydro-1H-isoindole are melted together at 150° for 2 hours. After cooling, the solidified melted material is treated with an ammonia solution, the insoluble material is filtered off and the filtrate is acidified with dilute hydrochloric acid. The precipitate is filtered off and recrystallized from isopropanol/petroleum ether. The compound indicated in the heading has a melting point of 152–153°.

The 5,6-dimethyl-2,3,3a,4,7,7a-hexahydro-1H-isoindole used as starting material is obtained as follows:

181 g. of 4,5-dimethyl-Δ⁴-tetrahydro-phthalimide are added in small portions whilst stirring and cooling to a suspension of 67 g. of lithium aluminium hydride in 3 litres of absolute ether. The mixture is heated at reflux for 12 hours. After cooling, the excess lithium aluminium hydride is decomposed by the careful addition of 150 ml. of water. Filtration is effected, the ether solution is dried over sodium sulphate and concentrated by evaporation in a vacuum. The residue is fractionated in a vacuum. The desired compound distils over at 100–103° and 12 mm. of Hg.

EXAMPLE 11

N-(4-methylsulphonylbenzenesulphonyl)-2-octahydro-isoindole carboxamide 12.5 g. of octahydro-isoindole and 30.7 g. of 4-methylsulphonylbenzenesulphonyl-carbamic acid ethyl ester are melted together and heated to 150° for 2 hours. After cooling, the solidified melted material is recrystallized from isopropanol. The compound indicated in the heading has a melting point of 185–186°.

The 4-methylsulphonylbenzenesulphonyl-carbamic acid ethyl ester used as starting material is produced as follows:

60.7 g. of chloroformic acid ethyl ester are added dropwise during the course of 10 minutes to a suspension of 101 g. of 4-methylsulphonylbenzene sulphonamide and 153 g. of potassium carbonate in 525 ml. of absolute acetone and the mixture is heated to the boil at reflux whilst stirring for 16 hours. The precipitated material is filtered off from the cooled reaction mixture. The dry residue is dissolved in 2000 ml. of water, the alkaline solution is strongly acidified by the careful addition of concentrated hydrochloric acid, the precipitated crystalline material is filtered off, washed with water and dried. After recrystallization from ethanol 4-methylsulphonylbenzenesulphonyl-carbamic acid ethyl ester has a melting point of 124–126°.

EXAMPLE 12

N-(4-acetylaminobenzenesulphonyl)-2-octahydro-isoindole-carboxamide

This compound is obtained from 12.5 g. of octahydro-isoindole and 28.6 g. of 4-acetamino-benzenesulphonyl-carbamic acid ethyl ester in a manner analogous to that described in Example 11. Melting point 213–215° (from ethanol/petroleum ether).

EXAMPLE 13

N-benzenesulphonyl-2-octahydro-isoindole-carboxamide 6.25 g. of octahydro-isoindole and 11.5 g. of benzenesulphonyl-carbamic acid ethyl ester are melted together and heated to 150° for 2 hours. After cooling, the glassy mass is pulverized and recrystallized from isopropanol. The compound indicated in the heading has a melting point of 147–148°.

EXAMPLE 14

N-(4-toluenesulphonyl)-5-methyl-2,3,3a,4,7,7a-hexahydro-1H-isoindole-2-carboxamide 13.7 g. of 5-methyl-2,3,3a,4,7,7a-hexahydro-1H-isoindole and 24.3 g. of 4-toluenesulphonyl-carbamic acid ethyl ester are melted together and heated to 150° for 2 hours. After cooling, the solidified mass is recrystallized from ethyl acetate/petroleum ether. The compound indicated in the heading has a melting point of 108–109°.

The 5-methyl-2,3,3a,4,7,7a-hexahydro-1H-isoindole used as starting material is obtained as follows:

238 g. of 4-methyl-Δ⁴-tetrahydro-phthalimide are added in small portions whilst stirring and cooling to a suspension of 100 g. of lithium aluminium hydride in 3 litres of absolute ether. The mixture is heated at reflux for 12 hours. After cooling, the excess lithium aluminium hydride is decomposed by the careful addition of 150 ml. of water. Filtration is effected, the ether solution is dried over sodium sulphate and concentrated by evaporation in a vacuum. The residue is fractionated in a vacuum. The desired compound distils over at 90–92° and 12 mm. of Hg.

What is claimed is:

1. A compound selected from the group consisting of a compound of formula:

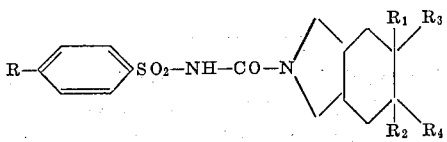

in which

R is hydrogen or chloro, methyl, methoxy, methylthio, methylsulphinyl, methylsulphonyl, acetyl, nitro, amino or acetyl-amino, each of $R_1$ and $R_2$ is hydrogen or together are a second bond, and each of $R_3$ and $R_4$ is hydrogen or methyl, and the pharmaceutically acceptable alkali metal, alkaline earth metal and ammonium salts thereof.

2. A compound according to claim 1, in which the compound is N-(4-toluenesulphonyl)-2-octahydro-isoindole carboxamide.

3. A compound according to claim 1, in which the compound in N-(4-chlorobenzenesulphonyl)-2-octahydro-isoindole carboxamide.

4. A compound according to claim 1, in which the compound is N-(4-nitrobenzensulphonyl)-2-octahydro-dro-isoindole carboxamide.

5. A compound according to claim 1, in which the compound is N-(4-nitrobenzenesulphonyl)-2-octahydro-isoindole carboxamide.

6. A compound according to claim 1, in which the compound is N-(4-methoxybenzenesulphonyl)-2-octahydro-isoindole carboxamide.

7. A compound according to claim 1, in which the compound is N-(4-acetylbenzenesulphonyl)-2-octahydro-isoindole carboxamide.

8. A compound according to claim 1, in which the compound is N-(4-aminobenzenesulphonyl)-2-octahydro-isodinole carboxamide.

9. A compound according to claim 1, in which the compound is N-(4-toluenesulphonyl)-2,3,3a,4,7,7a-hexahydro-1H-isoindole-2-carboximide.

10. A compound according to claim 1, in which the compound is N-(4-toluensulphonyl)-5,6-dimethyl-2,3,3a,4,7,7a-hexahydro-1H-isoindole-2-carboxamide.

11. A compound according to claim 1, in which the compound is N-(4-methylsulphonylbenzenesulphonyl)-2-octahydro-isoindole carboxamide.

12. A compound according to claim 1, in which the compound is N-(4-acetylaminobenzenesulphonyl)-2-octahydro-1H-isoindole-2-carboximide.

13. A compound according to claim 1, in which the compound is N-benzenesulphonyl-2-octahydro-isoindole carboximide.

14. A compound according to claim 1, in which the compound is N-(4-toluenesulphonyl)-5-methyl-2,3,3a,4,7,7a-hexahydro-1H-isoindole-2-carboxamide.

References Cited

UNITED STATES PATENTS

| | | | |
|---|---|---|---|
| 3,426,017 | 2/1969 | Jucker et al. | 260—239.6 |
| 3,432,491 | 3/1969 | Jucker et al. | 260—239.6 |
| 3,503,962 | 3/1970 | Beregi et al. | 260—239.6 |

HENRY R. JILES, Primary Examiner

C. M. SHURKO, Assistant Examiner

U.S. Cl. X.R.

260—326.1, 397.7, 453, 465, 470; 424—229, 274